United States Patent
Letca et al.

(10) Patent No.: US 7,917,613 B2
(45) Date of Patent: Mar. 29, 2011

(54) HEARTBEAT HEURISTICS

(75) Inventors: Ilarie G. Letca, Redmond, WA (US);
Brijesh D. Bhatia, Redmond, WA (US);
Stefan C. Negritoiu, Seattle, WA (US);
Vladimir Joanovic, Oakville (CA)

(73) Assignee: Microsoft Corporation, Redmond, WA (US)

( * ) Notice: Subject to any disclaimer, the term of this patent is extended or adjusted under 35 U.S.C. 154(b) by 1460 days.

(21) Appl. No.: 11/275,797

(22) Filed: Jan. 30, 2006

(65) Prior Publication Data

US 2007/0180077 A1    Aug. 2, 2007

Related U.S. Application Data

(60) Provisional application No. 60/736,915, filed on Nov. 15, 2005.

(51) Int. Cl.
*G06F 15/173* (2006.01)
(52) U.S. Cl. .......................................... 709/224; 709/223
(58) Field of Classification Search .................. 709/224, 709/203, 217, 223
See application file for complete search history.

(56) References Cited

U.S. PATENT DOCUMENTS

| | | | |
|---|---|---|---|
| 6,405,262 B1* | 6/2002 | Vogel et al. | 719/315 |
| 7,383,474 B2* | 6/2008 | Sekizawa | 714/57 |
| 7,395,328 B2* | 7/2008 | Ronneburg et al. | 709/223 |
| 7,395,428 B2* | 7/2008 | Williams et al. | 713/170 |
| 7,532,571 B1* | 5/2009 | Price et al. | 370/225 |
| 2002/0103897 A1* | 8/2002 | Rezvani et al. | 709/224 |
| 2004/0098480 A1* | 5/2004 | Sekizawa | 709/224 |
| 2005/0183143 A1* | 8/2005 | Anderholm et al. | 726/22 |
| 2007/0156706 A1* | 7/2007 | Hayes | 707/10 |
| 2009/0109857 A1* | 4/2009 | Statia et al. | 370/241 |
| 2009/0228519 A1* | 9/2009 | Purcell et al. | 707/104.1 |
| 2009/0299934 A1* | 12/2009 | Horvitz et al. | 706/45 |

* cited by examiner

*Primary Examiner* — Asad M Nawaz
*Assistant Examiner* — Sargon N Nano
(74) *Attorney, Agent, or Firm* — L. Alan Collins; Collins & Collins Incorporated

(57) ABSTRACT

A device monitoring system for monitoring a device comprising: a database including a health record for the device; a heartbeat server coupled to the database; a heartbeat agent operating on the device and coupled to the heartbeat server; a heartbeat packet sent from the heartbeat agent to the heartbeat server; and an update to the health record of the device responsive to the heartbeat packet.

16 Claims, 6 Drawing Sheets

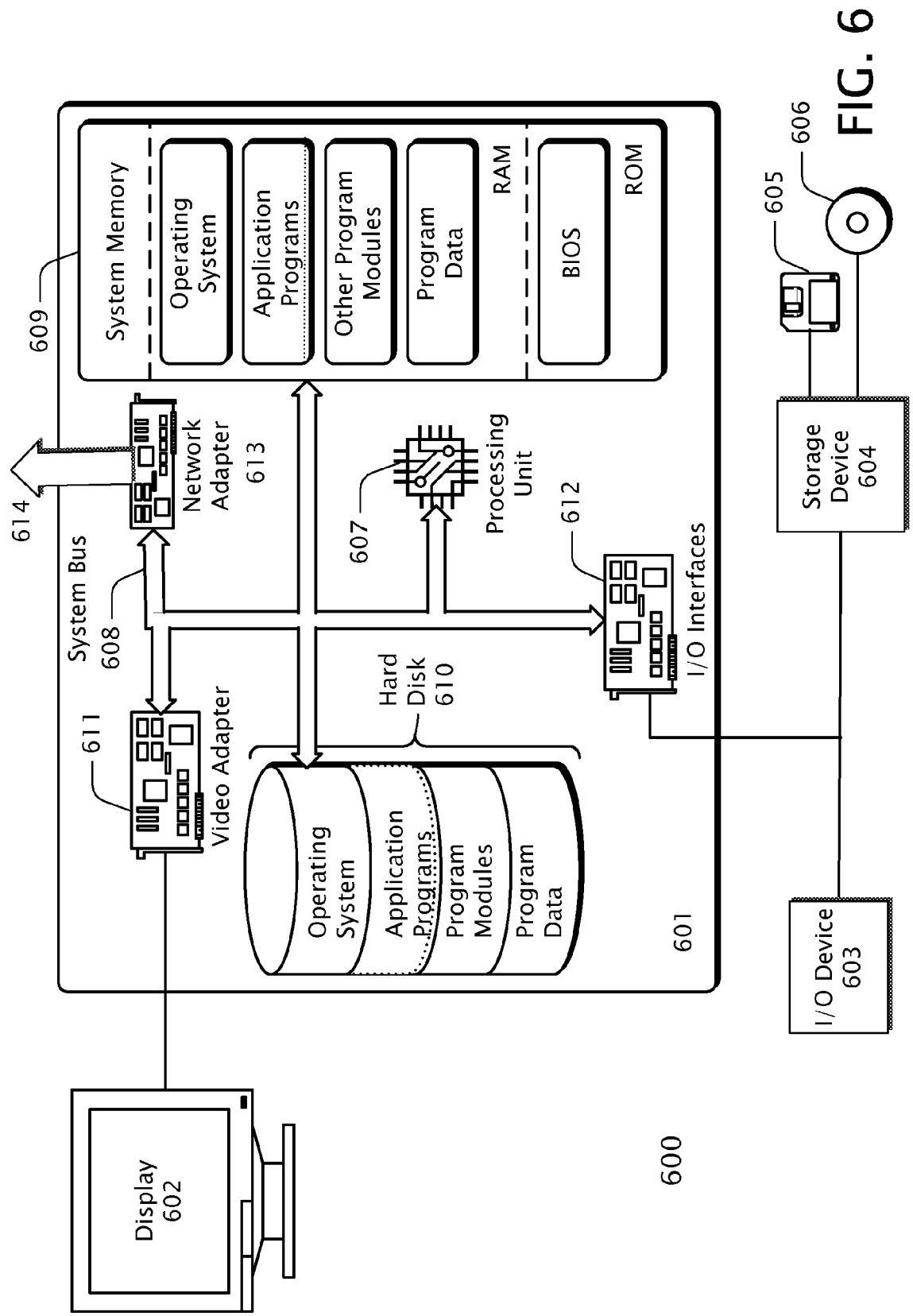

HEARTBEAT HEURISTICS

CROSS-REFERENCE TO RELATED APPLICATION(S)

This application claims benefit to U.S. Provisional Patent Application No. 60/736,915, filed on Nov. 15, 2005.

BACKGROUND

Today's complex and rapidly changing technology infrastructures demand increasing support and management. Operations management solutions support large and complex computing infrastructures with thousands of computing devices. An organization may use operations management to help meet business goals and objectives. These goals may include reducing costs, complexity, and providing information security. Reducing costs and complexity is important because, in addition to making up a significant part of the Information Technology ("IT") budget, the business impact of failed systems or performance degradation can be significant. This can result in increased operational costs, decreased quality of service, and lost revenue.

One type of operations management solution enables network administrators to monitor the health and status of an organization's computing devices. These computing devices may number in the thousands and are typically coupled to a network. Device monitoring may extend to personal computers ("PCs"), servers, laptops, hand-held devices, mobile devices, cluster systems, and any other type of computing device or the like. A key aspect of device monitoring is to determine and indicate whether the device is operational as well as able to perform its intended function.

Some key challenges related to device monitoring in large operations include monitoring large numbers of devices in an efficient manner and reporting status to administrators for the devices in a timely manner. Accomplishing this without overloading networking and computing infrastructure is a further challenge. Another challenge for device monitoring systems is security. Challenges related to security include resisting denial-of-service attacks, detecting status information from unauthorized devices, as well as other security considerations.

SUMMARY

The following presents a simplified summary of the detailed description in order to provide a basic understanding to the reader. This summary is not an extensive overview of the detailed description and may not identify key or critical elements of the invention or delineate the scope of the invention. The summary's sole purpose is to present some concepts disclosed herein in a simplified form as a prelude to the detailed description that is presented hereafter.

The present examples provide technologies that perform real-time monitoring of many computing devices from a central location. These technologies include the monitoring of a device's network connectivity as well as a device's ability to perform its intended function. Device monitoring may be performed using various types of heartbeat monitoring technologies, such as those described herein.

Many of the attendant features will be more readily appreciated as the same become better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is a block diagram showing an example computing environment in which the technology described above may be implemented.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Although the present examples are described and illustrated herein as being implemented in a computing and networking system, the system described is provided as an example and not a limitation. As those skilled in the art will appreciate, the present examples are suitable for application in a variety of different types of computing systems.

Figure 1:
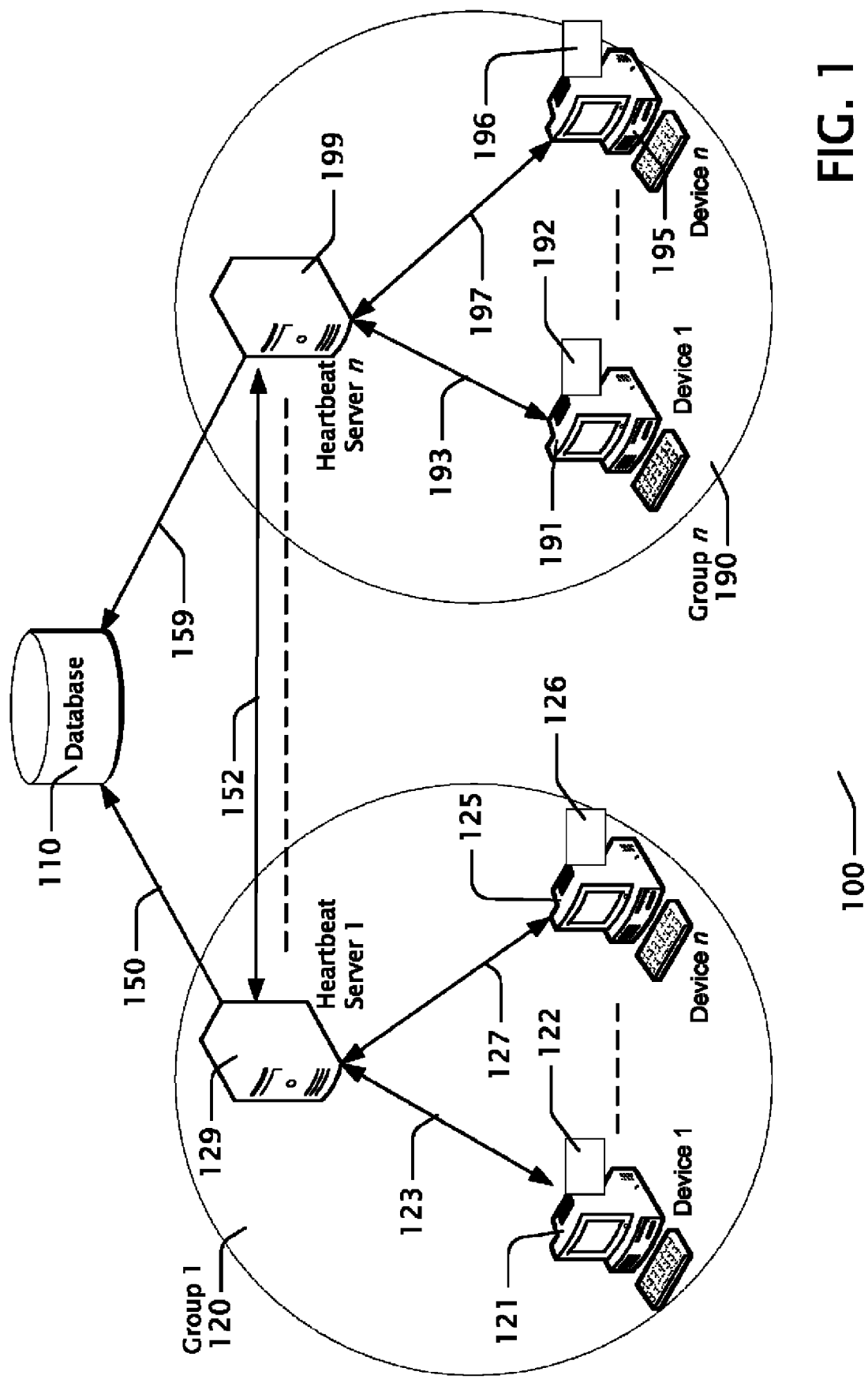
FIG. 1 is a block diagram showing an example architecture for a device monitoring system.

FIG. 1 is a block diagram showing an example architecture for a device monitoring system 100. Device monitoring system 100 monitors the health and status of a plurality of devices, such as example devices 121, 125, 191, and 195. Monitored devices may or may not be considered a part of the system. Health and status includes but is not limited to the operational status of a device, such as whether the monitoring system can communicate with the device, determine whether the device is responsive, obtain health information that can be used to determine if the device, and/or any systems or applications operating on the device, are capable of performing their intended functions.

Monitoring system 100 generally includes database 110 that, among other things, serves as a repository for device health and status information, and includes heartbeat servers such as examples 129 and 199, heartbeat agents such as examples 122, 126, 192, and 196 which operate on example devices 121, 125, 191, and 195 respectively, and communications links such as examples 123, 127, 150, 152, 159, 193, and 197, which are generally provided via a network and connectivity to the network.

Devices 121, 125, 191, and 195 represent devices monitored by the example monitoring system 100. A monitored device may be any computing system, electronic system, process, or the like, that is uniquely addressable or otherwise uniquely identifiable on a network and that is operable to communicate with other devices on the network. For example, and without limitation, a device may be a personal computer ("PC"), a server computer, a hand-held, mobile or laptop computer, a tablet PC, a multiprocessor system, a microprocessor-based system, a set top box, a consumer electronic device, a network PC, a minicomputer, a mainframe computer, or the like.

In one example, monitoring system 100 may provide groups, such as group 120 and group 190 that provide for the partitioning of the devices to be monitored. For example, in group 120, a heartbeat server 129 is provided to monitor the devices in group 120, such as example devices 121 and 125. Each group generally supports the monitoring of a plurality of devices. The number of devices in a group may be determined or limited by the communications and processing capacity of the group's heartbeat server. Typically a group may support hundreds or thousands of devices or more.

Heartbeat servers 129 and 199 communicate with devices in their respective groups to, among other things, monitor the health and/or status of the devices. In the example shown in FIG. 1, health and/or status information about the devices is stored and updated in the form of health records in system database 110. Heartbeat servers 129 and 199 may also communicate with each other, as indicated by arrow 152, typically over a network, to monitor the health and/or status of each other. In this manner monitoring system 100 can become aware of a problem with a heartbeat server. Alternatively, a heartbeat server may update database 110 with its own health and/or status information and monitor the health and/or status of other heartbeat servers via database 110.

Devices being monitored may include a heartbeat agent, such as those indicated by modules 122, 126, 192, and 196. A heartbeat agent may be implemented as a software application, module, logic circuit, process, service, thread or the like. A heartbeat agent provides, among other things, the functionality for monitoring the operational status and health of a device, for collecting and providing device health data, and for communicating the status and health data of the device to a heartbeat server, such as example heartbeat servers 129 and 199.

In one example, a heartbeat agent, such as agent 122 operating on device 121, sends a heartbeat packet to server 129. Such a heartbeat packet tends to indicate to server 129 that device 121 is operational. A heartbeat packet is typically formed as a data structure or communications protocol payload that includes a timestamp and an identifier ("ID") uniquely identifying the device from which the heartbeat packet originated. A heartbeat packet may also include health information about the device that can be used to determine if the device and/or its systems and applications are capable of performing their intended functions.

In some cases a device may not include a heartbeat agent (an agentless device) or the included agent may not be operational. In such cases, monitoring system 100 may periodically "ping" the device to determine if the device is responsive. However, further health information from the device may not be accessible without an agent operating on the device. For example, a ping may be sent from heartbeat server 129 to device 121. If device 121 replies to the ping, the reply indicates that device 121 is responsive and can communicate with server 129. The reply may not indicate anything regarding the overall health of the device or its systems or applications, but only that it is sufficiently operational to respond. A ping as used here is generally a simple message sent over a network to a specific device to which the device responds with a simple reply back to the sender of the ping. In one example, the ping may be an Internet Control Message Protocol ("ICMP") ping, or a user-definable ping configured via a user interface or some other mechanism.

A heartbeat agent includes information identifying the heartbeat server to which it sends heartbeat packets and/or health information. For example, heartbeat server 129 of group 120 may be configured to "own", or be responsible for monitoring and reporting the health of, the devices in group 120, such as example devices 121 and 125. Devices 121 and 125 are shown in FIG. 1 to include heartbeat agents 122 and 126 respectively. Each heartbeat agent may include information to identify heartbeat server 129 as their "owner server" or "monitoring server" along with sufficient information to enable sending status and/or heartbeat information to the owner server.

In an alternative example, a heartbeat agent operating on a device may be configured to monitor other devices. Such an agent may collect health and/or status information from the other devices it is configured to monitor and forward the collected health and/or status information regarding the other devices to a heartbeat server. Such collected health and/or status information may or may not be processed prior to being forwarded. For example, in a cluster system (a group of independent servers that generally operate—and appear to client devices—as if they were a single unit) comprising several cluster servers, one of the cluster servers (known as a "virtual heartbeat server") may include a heartbeat agent while the other servers in the cluster may not include a heartbeat agent. The heartbeat agent operating on the virtual heartbeat server may be configured by an administrator or via another mechanism to monitor the other cluster servers using, among others, the processes described in connection with FIGS. 4 and 5. Heartbeat agents operating on the other cluster servers are typically configured to send health and status information to the virtual heartbeat server.

According to one example implementation, agent 122 includes a fail-over list. A fail-over list identifies "backup" servers that are to be used in case the normal owner server becomes unreachable. An owner server may become unreachable because the owner server itself fails, communications with the owner server fails, or the like. In such an event, agent 122, for example, selects a backup server from its fail-over list to which it then sends heartbeat packets including status and/or health information. Backup servers may be specified per monitoring system, per group, per individual device, or based on some other scheme, or a combination of the foregoing. A heartbeat server may also be configured to optionally ignore heartbeat packets from a device for which it serves as a backup server. Configuration of backup servers may be done by an administrator or via some other mechanism. By combining backup server functionality with server-to-server monitoring, as shown by communications line 152, monitoring system 100 may provide fault-tolerance and high degrees of monitoring availability to devices and users.

A heartbeat packet may be sent over any communications media and using any communications protocol, but the media and/or protocol utilized may impact the scalability of monitoring system 100. For example, Transmission Control Protocol ("TCP") may be selected as the communications protocol for system 100. TCP is a connection-oriented protocol that generates non-trivial network traffic to send even simple messages, such as heartbeat packets. Such non-trivial network traffic, when used to monitor thousands of devices, may approach the available capacity of the network and thus limit the number of devices that can be monitored effectively while leaving sufficient network resources for other operations. Other possible protocols choices may present similar scalability issues. Alternatively, there may be protocol choices that are low-traffic and efficient. In one example, heartbeat packets may be sent using User Datagram Protocol ("UDP"), which tend to minimize packet heartbeat traffic on the network.

In an alternative architecture, device 121 may be a member of multiple groups and may send heartbeat packets including status and/or health information to multiple heartbeat servers. Device 121 may include multiple heartbeat agents, such as multiple instances of agent 121, or a single agent that sends heartbeat packages including status and/or health information to multiple heartbeat servers.

Device monitoring system 100 may be a target for attack. Examples of possible attacks include but are not limited to denial-of-service attacks as well as data sent from unauthorized devices. A heartbeat server, such as server 129, may be made resistant to such attacks. In one example, server 129 accepts heartbeat packets from registered devices, each device being registered using a unique identifier ("ID"). Packets arriving from unregistered devices may be ignored and the source address of the packets and the receiving heartbeat server indicated by monitoring system 100. Device status and health information, and/or ID information may be encrypted to reduce unauthorized access to such information. Further, server 129 may be configured to ignore packets from a specific device, registered or not, if the incoming packet rate from the device exceeds an established threshold, such as a rate-per-second threshold. The source address of such packets and the receiving heartbeat server may be indicated by monitoring system 100. The number of ignored packets may also be counted and indicated by the monitoring system 100. The threshold and the duration for which packets are ignored, if at all, may be configured by an administrator or via another mechanism.

Another possible attack includes a rogue heartbeat agent sending heartbeat packets, perhaps on behalf of a valid heartbeat agent. To help minimize this type of attack, in one example, a valid heartbeat agent maintains a persistent connection, such as a TCP connection, with its owner heartbeat server and sends a periodic message to the server over the persistent connection. The device establishing such a TCP connection may be validate and/or authenticated by the server. If such periodic messages are not received by the server as expected, and/or the TCP connection is broken, then the agent is typically considered "down" by the server even if heartbeat packets apparently from the agent are received by the server. The valid agent is considered down in this case because, when the expected periodic messages are not received from the agent, and/or the TCP connection is broken, any received heartbeat packets at the server may originate from a rogue agent masquerading as the valid agent.

Figure 2:
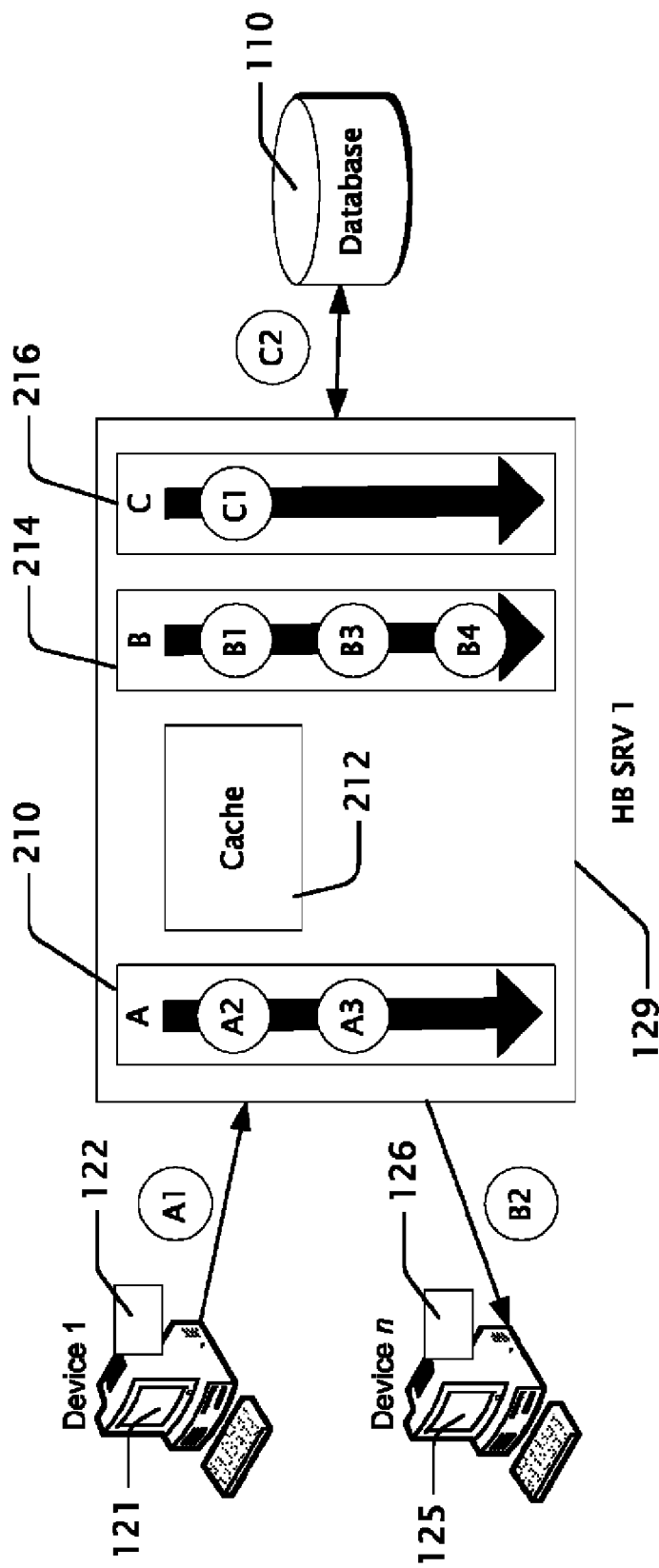
FIG. 2 is a block diagram showing an example set of workflows in a heartbeat server.

FIG. 2 is a block diagram showing an example set of workflows in a heartbeat server, such as example server 129. Example devices 121 and 125 include example heartbeat agents 122 and 126 respectively. Heartbeat server 129 communicates with heartbeat agents 122 and 126 and database 110. In one example, a heartbeat agent operates on a device other than a heartbeat server, such as a PC, laptop, or the like. In another example, a heartbeat agent operates on a heartbeat server and communication between the heartbeat agent and the heartbeat server may remain local to the heartbeat server. Heartbeat server 129 as shown in this example includes cache 212 and three workflows: communication workflow ("A") 210, heartbeat check workflow ("B") 214, and database update workflow ("C") 216. Each workflow may be implemented as a software application, module, logic circuit, process, service, thread, or the like. Alternate implementations may provide equivalent device monitoring functionality and may utilize any number of workflows. Cache 212 may be any type of data store, located on the host heartbeat server or elsewhere. In one example, the cache is formed using system memory located on the host heartbeat server. The circles in FIG. 2, such as A1, A2, and so forth, indicate various work items. A work item is a specific task or operation performed by a device or a workflow. The following describes an example a sequence of workflow operations and their associated mechanisms for providing monitoring functionality. Other sequences may also be used.

In one example, cache 212 includes a table indicating the owned devices, typically with an entry in the table for each owned device. Each entry may include an "ignore missing heartbeats" flag that may be set by the system or via another mechanism. Each time a heartbeat packet is received by the server from a device, the cache table entry for that device is updated to indicate the reception of a new heartbeat packet. If any status and/or health information is received from a device, the cache table entry for the device is updated indicating the newly-arrived information.

As indicated by work item A1, device 121 sends a heartbeat packet to server 129. A heartbeat agent operating on a device typically sends a heartbeat packet once every heartbeat send ("HBS") interval. In one example, the HBS interval defaults to a predetermined time interval, such as 10 seconds, and may be configurable by an administrator. The HBS interval is further described in connection with FIG. 3. Workflow A becomes operational when a heartbeat packet is received by heartbeat server 129. Work item A2 indicates the heartbeat packet being received and processed by workflow A. In one example, for each heartbeat packet received, a cache table entry corresponding to the device that sent the heartbeat packet is updated, the updated entry indicating that a new heartbeat packet from the device was received and including any health and/or status information from the device. Work item A3 indicates that workflow A is updating the cache to indicate the newly arrived heartbeat packet from device 121 and updating any status and/or health information provided in the packet about device 121.

Workflow B becomes operational every heartbeat check ("HBC") interval. In one example, the HBC interval defaults to a predetermined time interval, such as 40 seconds, and may be configurable by an administrator. The HBC interval is further described in connection with FIG. 3. As indicated by work item B1, workflow B scans cache 212 for any device that has not had its cached table updated as a result of a new heartbeat packet since the last HBC interval, ignoring any table entries with the "ignore missing heartbeats" flag set. In one example, for devices with updated cache table entries, indicating a new heartbeat packet has been received from a corresponding device since the last HBC interval, the table entry is then cleared by work item B1.

Figure 4:
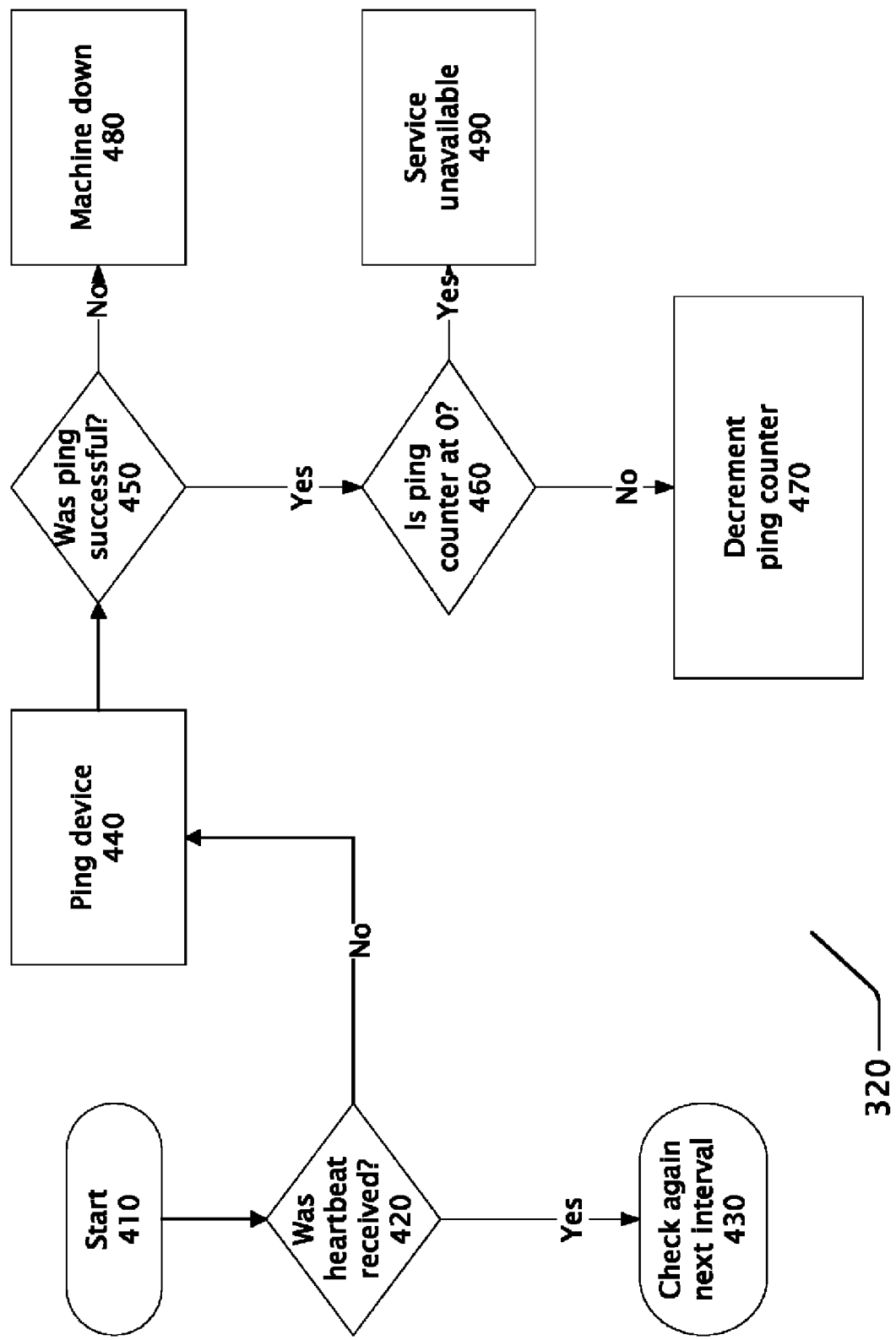
FIG. 4 is a block diagram showing an example of a heartbeat check ("HBC") process.
Figure 5:
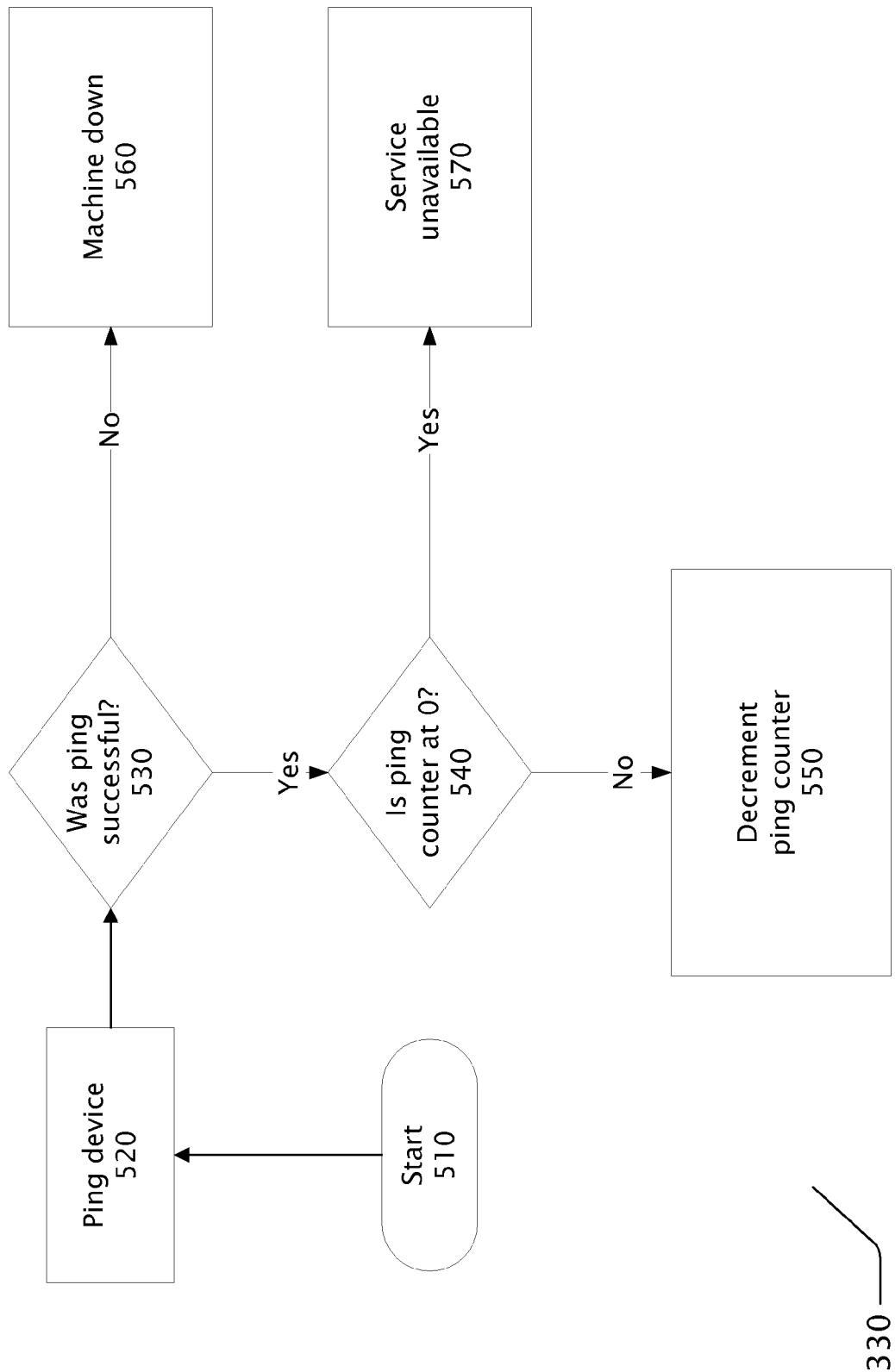
FIG. 5 is a block diagram showing an example of an agentless ping (ASP) process.

As indicated by work item B2, server 129 pings each device that, during work item B1, did not have an updated cache table entry, and that did not have its ignore missing heartbeats flag set, and that had a non-zero ping counter (as described further in FIGS. 4 and 5). Workflow B may ping a device multiple times, based on the ping counter, with a configurable delay between each ping. Each device that receives a ping and that is capable of a reply sends a ping reply back to the server. If a heartbeat packet is received from a pinged device during the ping process, then the cache table entry for the device is updated and the ping process for the device is cancelled. If a ping reply is received the cache table entry for the device is updated accordingly. Work item B3 indicates workflow B receiving any ping replies. Work item B4 indicates workflow B detecting devices that fail to respond to a ping. The ping process and ping counter for each device are further described in connection with FIGS. 4 and 5.

Workflow C becomes operational every database update ("DBU") interval. In one example, the DBU interval may be configured by an administrator. Work item C1 indicates workflow C inspecting cache 212 for updated device health and/or status information. Work item C2 indicates workflow C updating database 100 with updated device health and/or status information from cache 212. In one example, a buffer may be filled with updates, the information in the buffer written to database 100 and the buffer subsequently cleared.

Figure 3:
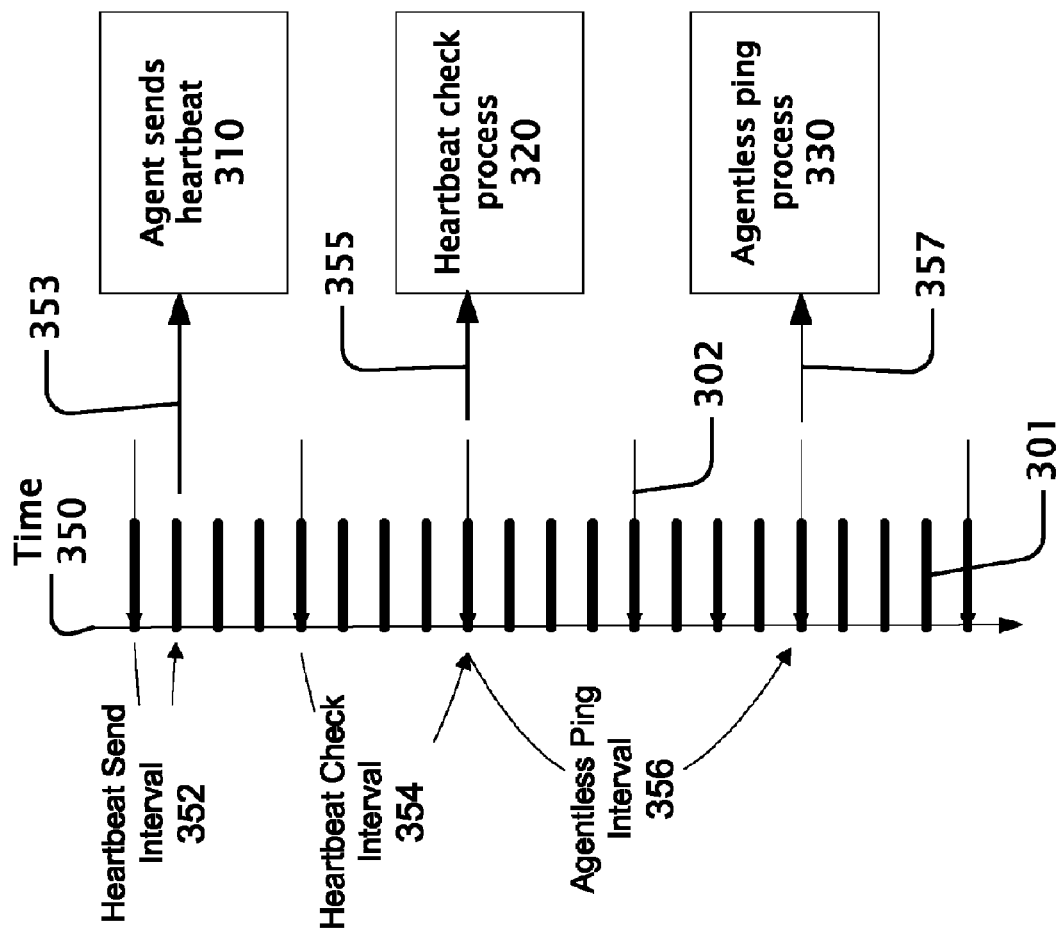
FIG. 3 is a diagram showing a time line of various example intervals, and the various example processes initiated at those intervals by devices and/or heartbeat servers.

FIG. 3 is a diagram showing a time line 350 of various example intervals 352, 354, and 356, and the various example processes 310, 320, and 330 initiated at those intervals by devices and/or heartbeat servers. Each shorter, bold line on time line 350, such as line 301, indicates the sending of a heartbeat packet from a device to a heartbeat server. The heartbeat agent operating on a device generally sends a heartbeat packet to a heartbeat server at HBS interval 352. For example, the initiation of one such heartbeat send at an HBS interval is indicated by arrow 353 and block 310. Heartbeat agents operating on different devices, or multiple heartbeat agents operating on a single device, are typically not be synchronized in the sending of heartbeat packets.

A heartbeat server generally checks to see if a heartbeat packet has been received from each owned device at HBC interval 354. Each longer, narrow line on time line 350, such as line 302, indicates the initiation of an HBC process 320. For example, the initiation of one such check at an HBC interval is indicated by arrow 355 and block 320. An example of an HBC process 320 is described in connection with FIG. 4. In one example, the HBC interval 354 tends to be a multiple of the HBS interval 352, but may not be synchronized with or occur coincident to the HBS interval 352.

In situations where a device without a heartbeat agent is being monitored, a heartbeat server will typically monitor the device via a ping process initiated at each agentless ping ("ASP") interval 356. For example, one such ping process is indicated by arrow 357 and block 330. An example of an ASP process 330 is described in connection with FIG. 5. In one example, the ASP interval 356 tends to be a multiple of the HBC interval 354, but may not be synchronized with or occur coincident to the HBC interval 354.

FIG. 4 is a block diagram showing an example of a heartbeat check ("HBC") process 320. An HBC process is generally initiated on a heartbeat server at each HBC interval. Block 410 indicates the start of the HBC process, which continues as follows.

At block 420, the heartbeat server checks whether a heartbeat packet has been received from each owned device since the last HBC interval. In one example, this check may be performed by inspecting a cache entry for each owned device. For each device for which a new heartbeat packet has been received, the device is considered operational, the device's status is considered "up", and the HBC process is complete until the next HBC interval, as indicated by block 430.

In the event that a device's heartbeat packet was sent but not received by the heartbeat server, such as when the heartbeat packet is lost on the network or the like, the next heartbeat packet sent by the device may be received by the server. In this case, the next time the HBC process is initiated, the server will detect that a new heartbeat packet has been received for the device. In the event that a device has recently failed or is no longer able to communicate with the heartbeat server, a heartbeat packet will not be received by the server from the device. For any devices for which a new heartbeat packet has not been received, the process continues at block 440.

In an alternative example, a device may be considered to be in "maintenance mode," typically indicating to the monitoring system that the device can be ignored. A device may be configured to be in maintenance mode by an administrator or via another mechanism. For such a device, the heartbeat server may ignore whether or not a new heartbeat packet has been received and complete the HBC process for the device. The heartbeat server typically continues to ignore heartbeat packets from a device in maintenance mode until the configuration of the device is changed to no longer indicate maintenance mode.

At block 440, for each device for which a new heartbeat packet has not been received, a ping is sent to the device. Each device receiving the ping and capable of a reply will send a ping reply back to the server.

At block 450, the heartbeat server checks whether a ping reply has been received from each pinged device. The amount of time a server will wait for a ping reply is a ping time-out period. If no ping reply has been received for a device within the ping time-out period, an additional ping may be sent to the device. The ping time-out period and number of additional pings may be configured by an administrator or via another mechanism.

In one example, if no ping reply is received from a device, then the device may have failed and the device's status is considered to be "down", as indicated at block 480. The server may send multiple pings to a device, without receiving a reply, before considering the device to be down. A device that is down may have failed or may otherwise be unable to communicate with the heartbeat server. For each device that is considered down, the HBC process is complete.

At block 460, for each device for which a ping reply is received, the server checks a ping counter for the device. Each ping counter tracks the number of pings sent to the corresponding device, along with the replies by the device, and helps determine when a device's heartbeat agent in inoperative or unavailable. A default value for the ping counter may be configured by an administrator or via another mechanism. If the ping counter is zero, indicating that the preconfigured number of pings have been sent to a device, then the heartbeat agent on the device is considered inoperative or unavailable, as indicated at block 490. If the ping counter for a device is not zero, then the process continues for the device at block 470.

At block 470, the ping counter for the device is decremented and the process is complete until the next HBC interval.

FIG. 5 is a block diagram showing an example of an agentless ping (ASP) process 330. An ASP process is generally initiated on a heartbeat server at each ASP interval, as described in connection with FIG. 3. A heartbeat server generally uses an ASP process to monitor devices that do not include a heartbeat agent, known as agentless devices. Block 510 indicates the start of an ASP process. References to a device below generally refer to an agentless device or a device on which an agent is not operational.

At block 520, a ping is sent from a heartbeat server to each device. Each device receiving a ping and capable of a reply will send a ping reply back to the server. In the event that a device has recently failed or is no longer able to communicate with the heartbeat server, a ping reply will not be received by the server from the device. The maximum number of devices sent a ping may be limited by a configuration setting.

At block 530, the heartbeat server checks whether a ping reply was received from each pinged device. The amount of time a server will wait for a ping reply is generally the ping time-out period. If no ping reply is received within the ping time-out period, an additional ping may be sent to the device. The ping time-out period and number of additional pings may be configured by an administrator or via another mechanism.

At block 560, if no ping reply is received from a device before the ping time-out period expires, then the device may have failed and the device's status may be considered to be "down". The server may send multiple pings to a device without receiving a reply before considering the device to be down. A device that is down may have failed or may otherwise be unable to communicate with the heartbeat server. For each device that is considered down, the ASP process is complete.

At block 540, for each device for which a ping reply is received the server checks a ping counter for the device. The ping counter tracks the number of pings sent to a device and replied to by the device and helps determine whether a heartbeat agent is operative on the device. A default value for the ping counter may be configured by an administrator or via another mechanism. If the ping counter has reached zero, indicating that the preconfigured number of pings have been sent, then the device either does not include a heartbeat agent or the heartbeat agent is inoperative. In either case a heartbeat agent, and the host device's status, are considered unavailable, as indicated at block 570. If the ping counter is not zero for a device, then the process continues for the device at block 550. At block 550, the ping counter for the device is decremented and the process is complete until the next ASP interval.

FIG. 6 is a block diagram showing an example computing environment 600 in which the technology described above may be implemented. A suitable computing environment may be implemented with numerous general purpose or special purpose systems. Examples of well known systems may include, but are not limited to, personal computers ("PC"), hand-held or laptop devices, microprocessor-based systems, multiprocessor systems, servers, workstations, consumer electronic devices, set-top boxes, and the like.

Computing environment 600 generally includes a general-purpose computing system in the form of a computing device 601 coupled to various peripheral devices 602, 603, 604 and the like. System 600 may couple to various input devices 603, including keyboards and pointing devices, such as a mouse or trackball, via one or more I/O interfaces 612. The components of computing device 601 may include one or more processors (including central processing units ("CPU"), graphics processing units ("GPU"), microprocessors ("uP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored on the hard disk 610, other storage devices 604, 605, 606 and system memory 609 (typically limited by available space) including, by way of example, operating systems, application programs, data files, directory structures, and computer-executable instructions.

Output devices, such as display device 602, may be coupled to the computing device 601 via an interface, such as a video adapter 611. Other types of output devices may include printers, audio outputs, tactile devices or other sensory output mechanisms, or the like. Output devices may enable computing device 601 to interact with human operators or other machines or systems. A user may interface with computing environment 600 via any number of different input devices 603 such as a keyboard, mouse, joystick, game pad, data port, and the like. These and other input devices may be coupled to processor 607 via input/output interfaces 612 which may be coupled to system bus 608, and may be coupled by other interfaces and bus structures, such as a parallel port, game port, universal serial bus ("USB"), fire wire, infrared port, and the like.

Computing device 601 may operate in a networked environment via communications connections to one or more remote computing devices through one or more local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, communications media, and the like.

The invention claimed is:

1. A device monitoring system for monitoring a device comprising:
    a database including a health record representing health of the device;
    a heartbeat server coupled to the database and to a heartbeat agent operating on the device;
    the heartbeat server configured for receiving a heartbeat packet sent from the heartbeat agent and for updating the health record representing the health of the device based on health information provided by the heartbeat agent about the device in the received heartbeat packet, wherein the health information indicates an operational status of the device, and wherein the device is configured for sending heartbeat packets on a heartbeat send interval, and wherein the sending the heartbeat packets is not synchronized with sending of other heartbeat packets by other devices, and wherein the heartbeat server is further configured for checking for received heartbeat packets on a heartbeat check interval, and wherein the heartbeat check interval is a multiple of the heartbeat send interval;
    the heartbeat server further configured for updating a cache entry responsive to the received heartbeat packet, the cache entry representing health of the device;
    the heartbeat server further configured for setting an indication that the received heartbeat packet was received;
    the heartbeat server further configured for determining if the received heartbeat packet was received from the device on the heartbeat check interval, and if the received heartbeat packet was received from the device on the heartbeat check interval then indicating an "up" status for the device, but if the received heartbeat packet was not received from the device on the heartbeat check interval then sending a ping to the device and then determining if a ping reply was received from the device, and if the ping reply was received then indicating a "heartbeat agent unavailable" status for the device, but if the ping reply was not received then indicating a "down" status for the device.

2. The system of claim 1 further comprising:
    a group including the heartbeat server and the device;
    a second group including a second heartbeat server and a second device, the second heartbeat server coupled to the database and to the second device.

3. The system of claim 2 further comprising a second heartbeat agent operating on the heartbeat server.

4. The system of claim 3 further comprising:
    the heartbeat server further coupled to the second heartbeat server;
    the second heartbeat server configured to receive a second heartbeat packet sent from the second heartbeat agent and to update a second health record representing health of the heartbeat server.

5. The system of claim 2 further comprising the second heartbeat server configured to send a ping to the second device.

6. The system of claim 5 further comprising:
    the second heartbeat server further configured to receive a ping reply; and
    the second heartbeat server further configured to update a third health record for the second device.

7. The system of claim 1 wherein the heartbeat packet conforms to User Datagram Protocol format.

8. The system of claim 1 further comprising a persistent connection between the heartbeat agent and the heartbeat server, the persistent connection configured to conform to a connection-oriented protocol.

9. The system of claim 8 wherein if the persistent connection is broken then the health record is updated to indicate that the heartbeat agent is "down".

10. The system of claim 1 wherein the device sends the heartbeat packet to a third heartbeat server, the third heartbeat server being coupled to a second database.

11. The system of claim 1 wherein the heartbeat packet includes information to determine if a system or an application operating on the device is capable of performing its intended functions.

12. The system of claim 1 wherein the heartbeat packet includes a timestamp and an identifier that uniquely identifies the device.

13. The system of claim 1 wherein the heartbeat agent includes information identifying the heartbeat server or identifying a backup heartbeat server.

14. A computer-implemented method for monitoring a device, the method comprising:
    receiving a heartbeat packet by a heartbeat server, wherein the received heartbeat packet was sent on a heartbeat send interval from a heartbeat agent operating on the device, and wherein the send interval of the device is not synchronized with send intervals of other devices, and wherein the received heartbeat packet includes health information provided by the heartbeat agent about the device, and wherein the health information indicates an operational status of the device;
    updating a cache entry responsive to the received heartbeat packet, the cache entry representing health of the device;
    setting an indication that the received heartbeat packet was received;
    determining, by the heartbeat server, if the received heartbeat packet was received from the device on a heartbeat check interval, wherein the heartbeat check interval is a multiple of the heartbeat send interval, and if the received heartbeat packet was received from the device on the heartbeat check interval then indicating an "up" status for the device, but if the received heartbeat packet was not received from the device on the heartbeat check interval then sending a ping to the device and then determining if a ping reply was received from the device, and if the ping reply was received then indicating a "heartbeat agent unavailable" status for the device, but if the ping reply was not received then indicating a "down" status for the device.

15. The method of claim 14 further comprising:
on a database update interval, determining if the cache entry has been updated; and
if the cache entry has been updated, updating a health record responsive to the cache entry.

16. At least one mass storage device storing computer-executable instructions that, when executed by a computer, cause the computer to perform a method for monitoring a device, the method comprising:
receiving a heartbeat packet by a heartbeat server, wherein the received heartbeat packet was sent on a heartbeat send interval from a heartbeat agent operating on the device, and wherein the send interval of the device is not synchronized with send intervals of other devices, and wherein the received heartbeat packet includes health information provided by the heartbeat agent about the device, and wherein the health information indicates an operational status of the device;
updating a cache entry responsive to the received heartbeat packet, the cache entry representing health of the device;
setting an indication that the received heartbeat packet was received;
determining, by the heartbeat server, wherein the heartbeat check interval is a multiple of the heartbeat send interval, and if the received heartbeat packet was received from the device on a heartbeat check interval, and if the received heartbeat packet was received on the heartbeat check interval then indicating an "up" status for the device, but if the received heartbeat packet was not received from the device on the heartbeat check interval then sending a ping to the device and then determining if a ping reply was received from the device, and if the ping reply was received then indicating a "heartbeat agent unavailable" status for the device, but if the ping reply was not received then indicating a "down" status for the device.

\* \* \* \* \*